United States Patent
Li et al.

(10) Patent No.: US 10,252,188 B2
(45) Date of Patent: Apr. 9, 2019

(54) GAS-LIQUID SEPARATION APPARATUS SUITABLE FOR GAS HYDRATE SLURRY

(71) Applicant: GUANGZHOU INSTITUTE OF ENERGY CONVERSION, CHINESE ACADEMY OF SCIENCES, Guangzhou, Guangdong (CN)

(72) Inventors: Xiaosen Li, Guangzhou (CN); Yisong Yu, Guangzhou (CN); Chungang Xu, Guangzhou (CN); Zhaoyang Chen, Guangzhou (CN); Ningsheng Huang, Guangzhou (CN); Gang Li, Guangzhou (CN)

(73) Assignee: GUANGZHOU INSTITUTE OF ENERGY CONVERSION, CHINESE ACADEMY OF SCIENCES, Guangzhou, Guangdong (CN)

( * ) Notice: Subject to any disclaimer, the term of this patent is extended or adjusted under 35 U.S.C. 154(b) by 199 days.

(21) Appl. No.: 15/485,679

(22) Filed: Apr. 12, 2017

(65) Prior Publication Data
US 2018/0169545 A1 Jun. 21, 2018

(30) Foreign Application Priority Data
Dec. 20, 2016 (CN) .......................... 2016 1 1186054

(51) Int. Cl.
*B01D 19/00* (2006.01)
*B01D 45/08* (2006.01)

(52) U.S. Cl.
CPC .......... *B01D 19/0036* (2013.01); *B01D 45/08* (2013.01)

(58) Field of Classification Search
CPC .............. B01D 17/045; B01D 17/0208; B01D 17/0214; B01D 17/085; B01D 17/00; B01D 17/042; B01D 17/12; B01D 19/0036; B01D 19/0042; B01D 45/08; B01D 19/00; E21B 43/34; Y10S 210/05; C10L 3/108
USPC .......... 95/165, 163, 164, 197, 198, 204, 220
See application file for complete search history.

(56) References Cited

U.S. PATENT DOCUMENTS

| | | | | |
|---|---|---|---|---|
| 5,132,011 A * | 7/1992 | Ferris | ................. | B01D 19/0042 96/184 |
| 5,378,353 A * | 1/1995 | Koch | ................. | B01D 17/0208 210/86 |
| 2003/0042213 A1 * | 3/2003 | Hard | .................... | B01D 17/045 210/807 |

* cited by examiner

*Primary Examiner* — Sharon Pregler
(74) *Attorney, Agent, or Firm* — Westerman, Hattori, Daniels & Adrian, LLP

(57) ABSTRACT

A gas-liquid separation apparatus suitable for gas hydrate slurry, comprising an upper chamber, a middle chamber, and a lower chamber; a gas-phase outlet and a pressurizing unit are disposed in a top of the upper chamber, the middle chamber is provided with a material inlet and a wire mesh demister, and the lower chamber is provided with a liquid-phase outlet and a plurality of deflector baffles. The arrangement of divided chambers can reduce the degree of hydrate dissociation in the slurry (i.e., loss of the sought gas) and improve the separation efficiency. With the pressurizing unit, it facilitates the setting of the required pressure for gas-liquid separation without introducing a pressure maintaining valve in the subsequent separation process, prevents the hydrate in the slurry from dissociating in the apparatus, and allows rapid separation between the slurry and the gas.

7 Claims, 1 Drawing Sheet

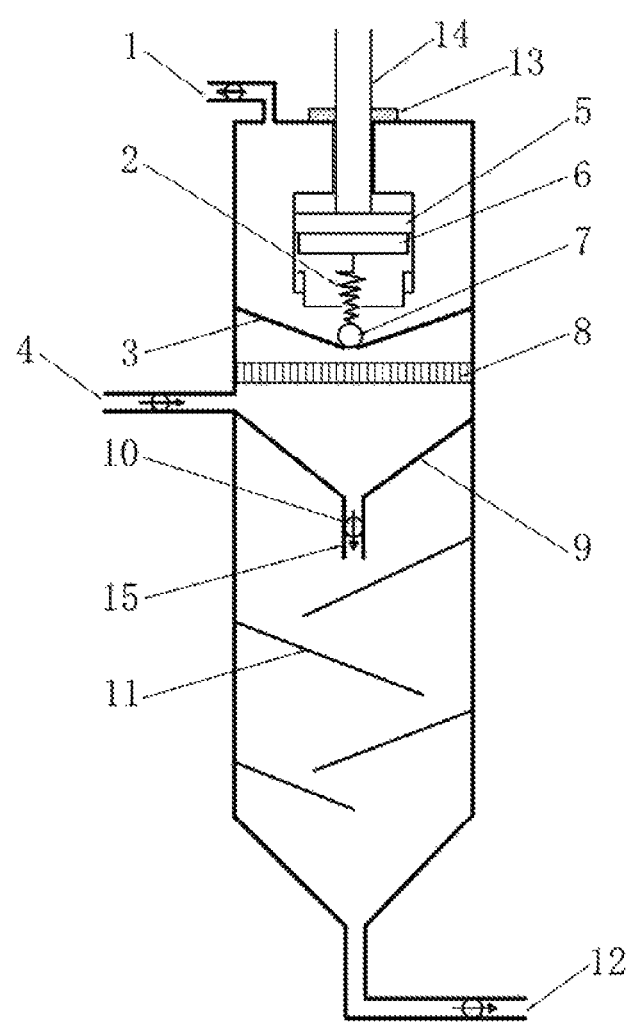

GAS-LIQUID SEPARATION APPARATUS SUITABLE FOR GAS HYDRATE SLURRY

FIELD OF THE INVENTION

The present invention relates to the technical field of multi-phase separation, and particularly to a gas-liquid separation apparatus suitable for gas hydrate slurry.

BACKGROUND OF THE INVENTION

Hydrate-based gas separation process, has been considered as a promising approach for gas separation. With the maturity of related technologies, hydrate-based gas separation has presented industrial prospect, and pilot plants have been developed. In hydrate-based gas separation, a gas is separated from its mixture mainly by forming hydrate of the sought gas. However, studies on the separation between the slurry and remaining gas after the hydrate formation were rarely reported.

Currently, traditional three-phase separators are used in the gas-liquid separation of hydrates. For example, Chinese patent application numbered as 201110003883.8 discloses a baffled separation apparatus for hydrate; Chinese patent application numbered as 201410675327.9 discloses a gas-liquid-solid three-phase separation apparatus with a spiral channel. However, hydrates have a tendency to dissociate, and once they dissociate in these apparatuses, the separation efficiency will decrease significantly. Thus, we need to develop a gas-liquid separation apparatus suitable for gas hydrate system.

SUMMARY OF THE INVENTION

In view of the problem in the hydrate-based gas separation process that including the difficulty of separating the slurry and the gases therein, and the dissociation tendency of hydrates, the objective of the present invention is to provide a gas-liquid separation apparatus suitable for gas hydrate slurry, which allows rapid separation between the slurry and the gas and minimizes the hydrate dissociation.

Provided is a gas-liquid separation apparatus suitable for gas hydrate slurry, having a main body which is a cylinder with both ends closed; a first funnel-shaped baffle device and a second funnel-shaped baffle device are disposed in the cylinder, so as to divide the cylinder into an upper chamber, a middle chamber, and a lower chamber; an gas hole for communicating the upper chamber and the middle chamber is disposed in a center of the first funnel-shaped baffle device, a flow guide pipe for communicating the middle chamber and the lower chamber is disposed in a center of the second funnel-shaped baffle device, and a unidirectional valve is disposed in the flow guide pipe.

A gas-phase outlet and a pressurizing unit are disposed in a top of the upper chamber; the pressurizing unit comprises a piston rod, an adjusting nut, a piston, a spring base, a compression spring and a metal ball which are sequentially connected; the piston rod penetrates a top wall of the upper chamber; the adjusting nut is disposed on a outer surface of the top wall of the upper chamber to adjust the motion range of the compression spring; the metal ball is disposed to cover the gas hole and can be pushed away from the gas hole by the gas pressure.

The middle chamber is provided with a material inlet and a wire mesh demister, the material inlet is connected with an upper edge of the second funnel-shaped baffle device, and the wire mesh demister is disposed at an upper end of the material inlet;

The lower chamber is provided with a plurality of deflector baffles which are alternately arranged below the flow guide pipe, an angle between each deflector baffle and an axis of the cylinder is 55°, and the lower chamber has a cone-shaped bottom with a liquid-phase outlet disposed at its lower end.

An angle between the first funnel-shaped baffle device and an axis of the cylinder can be 60°~80°.

The angle between the first funnel-shaped baffle device and the axis of the cylinder can be 75°.

An angle between the second funnel-shaped baffle device and the axis of the cylinder can be 30°~70°.

The angle between the second funnel-shaped baffle device and the axis of the cylinder can be 60°.

A height ratio between the upper chamber, the middle chamber and the lower chamber can be 1.5:1:3.

The cylinder, the pressurizing unit, the first funnel-shaped baffle device and the second funnel-shaped baffle device can all be made of stainless steel.

Compared with the prior art, the present invention provides the following advantages:

1. The apparatus of the present invention can separate the remaining gas from the hydrate slurry under a set pressure in a convenient way, and can prevent the hydrate from dissociating during the separation process which affects the separation efficiency.

2. The unidirectional valve and the arrangement of divided chambers can reduce the required gas amount for achieving the set pressure, and thereby the degree of hydrate dissociation in the slurry (i.e., loss of the sought gas) in the middle chamber will be reduced, and the reduction of the separation efficiency is prevented.

3. With the metal ball and the adjusting nut, the present invention facilitates the setting of the required pressure for gas-liquid separation without introducing a pressure maintaining valve in the subsequent separation process and prevents the hydrate in the slurry from dissociating in the apparatus.

4. The apparatus having a simple structure made of stainless steel does not require an external cooling means for temperature control, and thus greatly reducing the operating costs.

BRIEF DESCRIPTION OF THE DRAWINGS

FIG. 1 is a structural diagram of the gas-liquid separation apparatus of the present invention;

REFERENCE NUMBER

1: gas-phase outlet; 2: compression spring; 3: first funnel-shaped baffle device; 4: material inlet; 5: piston; 6: spring base; 7: metal ball; 8: wire mesh demister; 9: second funnel-shaped baffle device; 10: unidirectional valve; 11: deflector baffle; 12: liquid-phase outlet; 13: adjusting nut; 14: piston rod; 15: flow guide pipe.

DETAILED DESCRIPTION OF THE EMBODIMENTS

Further characteristics and advantages of the present invention will be more readily apparent from the below detailed description of the drawings and the embodiments.

Embodiment 1

As shown in FIG. 1, provided is a gas-liquid separation apparatus suitable for gas hydrate slurry, having a main body which is a cylinder with both ends closed; a first funnel-shaped baffle device 3 and a second funnel-shaped baffle device 9 are disposed in the cylinder, so as to divide the cylinder into an upper chamber, a middle chamber, and a lower chamber; an gas hole for communicating the upper chamber and the middle chamber is disposed in a center of the first funnel-shaped baffle device 3, a flow guide pipe 15 for communicating the middle chamber and the lower chamber is disposed in a center of the second funnel-shaped baffle device 9, and a unidirectional valve 10 is disposed in the flow guide pipe 15.

A gas-phase outlet 1 and a pressurizing unit are disposed in the top of the upper chamber; the pressurizing unit comprises a piston rod 14, an adjusting nut 13, a piston 5, a spring base 6, a compression spring 2 and a metal ball 7 which are sequentially connected; the piston rod 14 penetrates the top wall of the upper chamber, and has external threads on an outer wall thereof; the adjusting nut 13 is disposed on the outer surface of the top wall of the upper chamber and attached to the piston rod 14, and can be rotated so as to allow the vertical motion of the piston rod 14. The piston 5 is connected with the lower end of the piston rod 14, disposed in a piston chamber which is fixed in the upper chamber, and has an airtight contact with the inner wall of the piston chamber. The spring base 6 is attached to the bottom of the piston 5, and connected with the metal ball 7 via the compression spring 2; the metal ball 7 is disposed to cover the gas hole of the first tunnel-shaped baffle device 3, and when the pressure in the middle chamber reaches a set value, the metal ball will be pushed away from the gas hole so that the gas in the middle chamber can flow into the upper chamber. In order to cover the gas hole of the first tunnel-shaped baffle device 3, the metal ball 7 shall have a diameter greater than that of the gas hole. The mass of the metal ball 7 should not be too large (but generally larger than 0.1 kg) and one should choose an appropriate mass based on the required pressure range.

How the pressurizing unit works is described as follows. The adjusting nut 13 is rotated to allow the vertical motion of the piston rod 14, so that the position of the piston 5 is adjusted, the motion range of the compression spring 2 is modified, and thereby the force of the compression spring 2 applied on the metal ball is adjusted, which achieves a pressure setting function. During the separation, the set value of the pressure shall be greater than the phase equilibrium pressure of the hydrate so as to ensure that, the metal ball 7 can be pushed away from the hole when the pressure in the middle chamber is greater than the phase equilibrium pressure of the hydrate to allow the gas flow into the upper chamber and prevent the hydrate from dissociating during the separation process.

The middle chamber is provided with a material inlet 4 and a wire mesh demister 8, the material inlet 4 is connected with an upper edge of the second funnel-shaped baffle device 9, and the wire mesh demister 8 is disposed at an upper end of the material inlet 4.

The lower chamber is provided with a plurality of deflector baffles 11 which are alternately arranged below the flow guide pipe 15, an angle between each deflector baffle 11 and an axis of the cylinder is 55°, and the lower chamber has a cone-shaped bottom with a liquid-phase outlet 12 disposed at its lower end.

An angle between the first funnel-shaped baffle device 3 and the axis of the cylinder is 60°~80°.

An angle between the second funnel-shaped baffle device 9 and the axis of the cylinder is 30°~70°.

A height ratio between the upper chamber, the middle chamber and the lower chamber can be 1.5:1:3. The situation that the middle chamber is the smallest of the three chambers can reduce the required gas amount for achieving the set pressure, and thereby the degree of hydrate dissociation in the slurry (i.e., loss of the sought gas) in the middle chamber will be reduced, and the reduction of the separation efficiency is prevented.

The cylinder, the pressurizing unit, the first funnel-shaped baffle device 3 and the second funnel-shaped baffle device 9 are all made of stainless steel, and preferably 316 stainless steel. In the presence of stainless steel, when the fluid is introduced into the apparatus continuously, the temperature of the whole system will gradually decrease until it is identical with the temperature of the slurry at the material inlet, and thereby external cooling means is not required to prevent the hydrate from dissociating during the separation process.

A detailed separation process with the apparatus of the present invention is as follows:

(1) A hydrate slurry is fed into the middle chamber through the material inlet 4 along with the remaining gas. The slurry is directed to the flow guide pipe 15 by the first funnel-shaped baffle device 9, and rapidly flows into the lower chamber through the unidirectional valve 10. In the presence of the unidirectional valve 10, hydrate dissociation in the lower chamber will not affect the separation efficiency.

(2) The gas in the middle chamber rises, and the liquid droplets in the gas are removed by the wire mesh demister 8. When the pressure in the middle chamber is greater than the pressure applied by the pressurizing unit, the metal ball 7 is pushed away from the gas hole, and then the gas flows into the upper chamber and lows out of the apparatus through the gas-phase outlet for subsequent separation process.

(3) After flowing into the lower chamber, the slurry is buffered and directed to the cone-shaped bottom, and rapidly flows out of the apparatus through the liquid-phase outlet 12.

The separation of the hydrate slurry is achieved with the above steps.

The apparatus of the present invention can separate the remaining gas from the hydrate slurry under a set pressure in a convenient way, and can prevent the hydrate from dissociating during the separation process which affects the separation efficiency.

The unidirectional valve and the arrangement of divided chambers can reduce the required gas amount for achieving the set pressure, and thereby the degree of hydrate dissociation in the slurry (i.e., loss of the sought gas) in the middle chamber will be reduced, and the reduction of the separation efficiency is prevented.

With the metal ball, the compression spring and the adjusting nut, the present invention facilitates the setting of the required pressure for gas-liquid separation without introducing a pressure maintaining valve in the subsequent separation process and prevents the hydrate in the slurry from dissociating in the apparatus.

The apparatus having a simple structure made of stainless steel does not require an external cooling means for temperature control, and thus greatly reducing the operating costs.

The above detailed description is a specific explanation for feasible embodiments of the present invention. The embodiments are not used for limiting the scope of the present invention. Any equivalent or changes made on the basis of the present invention shall fall within the scope of the present invention.

The invention claimed is:

1. A gas-liquid separation apparatus suitable for gas hydrate slurry, having a main body which, is a cylinder with, both ends closed; a first funnel-shaped baffle device and a second funnel-shaped baffle device are disposed in the cylinder, so as to divide the cylinder into an upper chamber, a middle chamber, and a lower chamber; an gas hole for communicating the upper chamber and the middle chamber is disposed in a center of the first funnel-shaped baffle device, a flow guide pipe for communicating the middle chamber and the lower chamber is disposed in a center of the second funnel-shaped baffle device, and a unidirectional valve is disposed in the flow guide pipe, wherein:

a gas-phase outlet and a pressurizing limit are disposed in a top of the upper chamber; the pressurizing unit comprises a piston rod, an adjusting nut, a piston, a spring base, a compression spring and a metal ball which are sequentially connected; the piston rod penetrates a top wall of the upper chamber; the adjusting nut is disposed on a outer surface of the top wall of the upper chamber to adjust the motion range of the compression spring; the metal ball is disposed to cover the gas hole and can be pushed away from the gas hole by the gas pressure;

the middle chamber is provided with a material inlet and a wire mesh demister, the material inlet is connected with an upper edge of the second funnel-shaped baffle device, and the wire mesh demister is disposed at an upper end of the material inlet;

the lower chamber is provided with a plurality of deflector baffles which are alternately arranged below the flow guide pipe, an angle between each deflector baffle and an axis of the cylinder is 55°, and the lower chamber has a cone-shaped bottom with a liquid-phase outlet disposed at its lower end.

2. The gas-liquid separation apparatus according to claim 1, wherein an angle between the first funnel-shaped baffle device and an axis of the cylinder is 60°~80°.

3. The gas-liquid separation apparatus according to claim 2, wherein, the angle between the first funnel-shaped baffle device and the axis of the cylinder is 75°.

4. The gas-liquid separation apparatus according to claim 1, wherein an angle between the second funnel-shaped baffle device and an axis of the cylinder is 30°~70°.

5. The gas-liquid separation apparatus according to claim 4, wherein the angle between the second funnel-shaped baffle device and the axis of the cylinder is 60°.

6. The gas-liquid separation apparatus according to claim 1, wherein a height ratio between the upper chamber, the middle chamber and the lower chamber is 1.5:1:3.

7. The gas-liquid separation apparatus according to claim 6, wherein the cylinder, the pressurizing unit, the first funnel-shaped baffle device and the second funnel-shaped baffle device are all made of stainless steel.

* * * * *